US009536159B2

(12) United States Patent
Wu et al.

(10) Patent No.: US 9,536,159 B2
(45) Date of Patent: Jan. 3, 2017

(54) SMART GLASSES AND METHOD FOR RECOGNIZING AND PROMPTING FACE USING SMART GLASSES

(71) Applicant: Coretronic Corporation, Hsin-Chu (TW)

(72) Inventors: Chia-Chien Wu, Hsin-Chu (TW); Wei-Hsin Kan, Hsin-Chu (TW); Cheng-Yen Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 55 days.

(21) Appl. No.: 14/788,814

(22) Filed: Jul. 1, 2015

(65) Prior Publication Data
US 2016/0055371 A1    Feb. 25, 2016

(30) Foreign Application Priority Data

Aug. 21, 2014   (TW) .............................. 103128783 A

(51) Int. Cl.
*G06K 9/00*       (2006.01)
*H04L 29/08*      (2006.01)
(Continued)

(52) U.S. Cl.
CPC ......... *G06K 9/00979* (2013.01); *G02B 27/017* (2013.01); *G06K 9/00221* (2013.01);
(Continued)

(58) Field of Classification Search
CPC .............. G02B 2027/0138; G02B 2027/0141; G02B 2027/0178; G02B 27/017; G06K 9/00221; G06K 9/00671; G06K 9/00979; H04L 67/306
(Continued)

(56) References Cited

U.S. PATENT DOCUMENTS 8,705,177 B1    4/2014  Miao
8,724,853 B2 *  5/2014  Prada Gomez ...... G02B 27/017
                                                         382/103
(Continued)

FOREIGN PATENT DOCUMENTS

CN   103827728    5/2014
TW   200939143    9/2009
(Continued)

OTHER PUBLICATIONS

"Office Action of Taiwan Counterpart Application", issued on Jun. 25, 2015, p. 1-p. 5.

*Primary Examiner* — Manuchehr Rahmjoo
(74) *Attorney, Agent, or Firm* — Jianq Chyun IP Office

(57) ABSTRACT

Smart glasses and a method for recognizing and prompting a face are provided. The smart glasses store a database recording a plurality of profile information and business card information thereof. In the method, an image located in the field of view of the smart glasses is captured by an image capturing unit and at least one face appearing in the image is recognized. Facial features of each of the recognized faces are compared with those of the profile information in the database to find the profile information matching the facial features. In particular, if profile information matching the facial features is found, business card information corresponding to the profile information is displayed on a display unit; if profile information matching the facial features is not found, the business card information of a business card appearing in the image is recognized to associate the business card information with the recognized face.

12 Claims, 5 Drawing Sheets

(51) Int. Cl.
   *G02B 27/01* (2006.01)
   *G06Q 10/10* (2012.01)
(52) U.S. Cl.
   CPC ......... *G06K 9/00671* (2013.01); *G06Q 10/10* (2013.01); *H04L 67/306* (2013.01); *G02B 2027/0138* (2013.01); *G02B 2027/0141* (2013.01); *G02B 2027/0178* (2013.01)
(58) Field of Classification Search
   USPC ....................................................... 382/118
   See application file for complete search history.

(56) References Cited

U.S. PATENT DOCUMENTS

| | | |
|---|---|---|
| 2011/0026782 A1 | 2/2011 | Ego |
| 2015/0169946 A1* | 6/2015 | Needleman ........ G06K 9/00295 382/118 |
| 2015/0269420 A1* | 9/2015 | Kim .................... G06F 21/32 382/118 |

FOREIGN PATENT DOCUMENTS

| | | |
|---|---|---|
| TW | 201224955 | 6/2012 |
| TW | 201401184 | 1/2014 |
| TW | M480729 | 6/2014 |

* cited by examiner

SMART GLASSES AND METHOD FOR RECOGNIZING AND PROMPTING FACE USING SMART GLASSES

CROSS-REFERENCE TO RELATED APPLICATION

This application claims the priority benefit of Taiwan application serial no. 103128783, filed on Aug. 21, 2014. The entirety of the above-mentioned patent application is hereby incorporated by reference herein and made a part of this specification.

BACKGROUND OF THE INVENTION

Field of the Invention

The invention relates to a method and an apparatus for recognizing a human face, and more particularly, to smart glasses and a method for recognizing and prompting a human face using the smart glasses.

Description of Related Art

Social interaction is affected to different degrees by the development of technology. For instance, some become homebound due to the popularity of smart apparatuses and networking software, and on the other hand some wisely adopt smart apparatuses in their lives to expand their network and social life.

As time passes, the number of acquaintances is increased. In the case of a public figure or a successful businessman, networking is an even more important resource. However, not everyone can remember everything they ever see, and when a person that has not been seen for a long time suddenly appears with a cordial smile but only a vague impression of the person remains in memory such that the name or occupation cannot be successfully recalled when greeting the person, the situation can become quite awkward. Therefore, if the user can be helped to instantly recognize the person met, the social interaction and network expansion of the user can be significantly boosted.

Patents related to facial recognition via smart glasses include Taiwan Patent Publication No. 201401184, Taiwan Utility Model Patent Publication No. M480729, China Patent Publication No. 103827728, and US Patent Publication No. 20110026782.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides smart glasses and a method for recognizing and prompting a face using the smart glasses, which can facilitate instant recognition of a person met by a user.

Other objects and advantages of the invention can be further understood via the technical features disclosed in the invention.

To achieve one, a portion, or all of the above objects or other objects, an embodiment of the invention provides a method for recognizing and prompting a face adapted for smart glasses having an image capturing unit, a storage unit, and a display unit. The storage unit stores a database recording a plurality of profile information and business card information corresponding to each of the profile information. In the method, an image located in the field of view of the smart glasses is captured by an image capturing unit and at least one face appearing in the image captured by the image capturing unit is recognized. Then, facial features of each of the recognized faces are compared with those of the profile information in the database to find the profile information matching the facial features. In particular, if profile information matching the facial features is found, business card information corresponding to the profile information is displayed on the display unit; if profile information matching the facial features is not found, the business card information of a business card appearing in the image captured by the image capturing unit is recognized and the recognized business card information is associated with the recognized face.

In an embodiment of the invention, before the step of recognizing the business card information of the business card appearing in the image captured by the image capturing unit, the method further detects whether a business card appears in the image captured by the image capturing unit, accumulates the time for which the business card is not detected, and stops detecting the business card and recognizing the business card information when the accumulated time exceeds a preset value.

In an embodiment of the invention, in the step of comparing the facial features of each of the recognized faces with those of the profile information in the database to find the profile information matching the facial features, if the profile information matching the facial features is not found, the size of each of the recognized faces is calculated, and whether the size of the face is within a preset range is determined. In particular, if the size of the face is within the preset range, the recognition step of the business card information is started and the face for which the size is within the preset range is associated with the recognized business card information.

In an embodiment of the invention, the step of associating the recognized business card information with the recognized face further includes calculating the size of each of the recognized faces and determining whether the size of the face is within a preset range, and associating the face for which the size is within the preset range with the recognized business card information.

In an embodiment of the invention, the smart glasses further include a positioning unit, and the step of comparing the facial features of each of the recognized faces with those of the profile information in the database to find the profile information matching the facial features further includes positioning the smart glasses via the positioning unit to obtain the location of the smart glasses, and then comparing the location with the address in the business card information of each of the profile information in the database to select the profile information for which the address is close to the location, and comparing the facial features of the profile information with those of each of the recognized faces.

In an embodiment of the invention, the smart glasses further include a sound capturing unit, and in the method, a voiceprint signal is further captured via the sound capturing unit in the meantime of capturing the image via the image capturing unit, and the captured voiceprint signal is compared with the voiceprint signal of each of the profile information in the database to find the profile information matching the voiceprint signal. In particular, if the profile information matching both the voiceprint signal and the facial features is found, the business card information corresponding to the profile information is displayed on the display unit.

An embodiment of the invention provides smart glasses including an image capturing unit, a storage unit, a display unit, and a processing unit. In particular, the image capturing unit is configured to capture an image located in the field of view of the smart glasses. The storage unit is configured to store a database, and the database records a plurality of profile information and business card information corresponding to each of the profile information. The processing unit is coupled to the image capturing unit, the storage unit, and the display unit, and is configured to recognize at least one face appearing in the image captured by the image capturing unit, and compare the facial features of each of the recognized faces with those of the profile information in the database to find the profile information matching the facial features. In particular, if the profile information matching the facial features is found, the processing unit displays the business card information corresponding to the profile information on the display unit; if profile information matching the facial features is not found, the processing unit recognizes the business card information of a business card appearing in the image captured by the image capturing unit, and associates the recognized business card information with the recognized face.

In an embodiment of the invention, the processing unit further detects whether a business card appears in the image captured by the image capturing unit, accumulates the time for which the business card is not detected, and stops detecting the business card and recognizing the business card information when the accumulated time exceeds a preset value.

In an embodiment of the invention, if the processing unit does not find the profile information matching the facial features, the processing unit further calculates the size of each of the recognized faces and determines whether the size of the face is within the preset range. In particular, if the size of the face is within the preset range, the processing unit starts the step of recognizing the business card information and associates the face for which the size is within the preset range with the recognized business card information.

In an embodiment of the invention, the processing unit further calculates the size of each of the recognized faces and determines whether the size of the face is within a preset range, and only associates the face for which the size is within the preset range with the recognized business card information.

In an embodiment of the invention, the smart glasses further include a positioning unit for positioning the smart glasses to obtain the location of the smart glasses, wherein the processing unit further compares the location with the address in the business card information of each of the profile information in the database to select the profile information for which the address is close to the location, and compares the facial features of the profile information with those of each of the recognized faces.

In an embodiment of the invention, the smart glasses further include a sound capturing unit for capturing a voiceprint signal in the meantime of the image capturing unit capturing the image, wherein the processing unit includes comparing the captured voiceprint signal with the voiceprint signal of each of the profile information in the database to find the profile information matching the voiceprint signal, and displays the business card information corresponding to the profile information on the display unit when the profile information matching both the voiceprint signal and the facial features is found.

Based on the above, the smart glasses and the method for recognizing and prompting a face using the smart glasses of the invention find a profile information matching facial features in a pre-established database by taking an image of a person met by the user and recognizing the face, and display the business card information in the profile information to prompt the user. Accordingly, the user can instantly recognize a person met via the prompt of the business card information. Moreover, if a matching face is not found, the smart glasses of the invention can also automatically recognize the business card information and associate the business card information with the recognized face so as to be provided to the user next time the user meets the person.

In order to make the aforementioned and other features and advantages of the present invention more comprehensible, embodiments accompanied with figures are described in details below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The foregoing and other technical contents, features, and efficacies of the invention are intended to be described more comprehensively in the plurality of embodiments below accompanied with figures. In the following embodiments, wordings used to indicate direction, such as "up," "down," "front," "back," "left," and "right", merely refer to directions in the accompanying drawings. Therefore, the directional wordings are used to illustrate rather than limit the invention.

When meeting a person for the first time and exchanging business cards with the person, eye contact is usually made first and then the parties greet each other and present the business cards. At this point, eyes are turned from the other person to the business card received in the hand. Based on the above scenario, the invention takes an image of the person met via the smart glasses worn by the user to recognize the face, and then takes an image of the business card when the user looks at the business card to recognize the business card information, and thereby associate the recognized business card information with the face. Accordingly, when the user meets the person next time, the smart glasses can recognize the identity of the person via the comparison of the database and display the business card information thereof to the user, thus facilitating the user to instantly recognize the person met.

Figure 1:
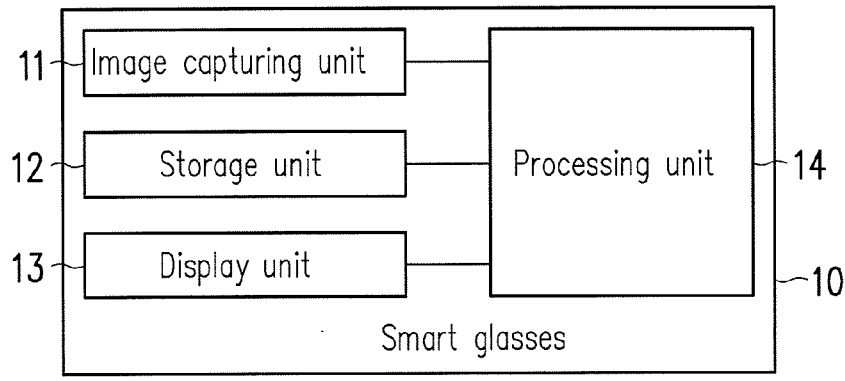
FIG. 1 is a block diagram of smart glasses illustrated according to an embodiment of the invention.

FIG. 1 is a block diagram of smart glasses illustrated according to an embodiment of the invention. Referring to FIG. 1, smart glasses 10 of the present embodiment include an image capturing unit 11, a storage unit 12, a display unit 13, and a processing unit 14, and the functions thereof are respectively as described below.

The image capturing unit 11 includes constituent devices such as a lens, a shutter, and a photosensitive device, such as a camera; wherein the photosensitive device is, for instance, a charge-coupled device (CCD), a complementary metal-oxide semiconductor (CMOS) device, or other similar devices. The image capturing unit 11 is configured to capture an image located in the field of view of the smart glasses.

The storage unit 12 can be any type of fixed or movable random access memory (RAM), read-only memory (ROM), flash memory, a similar device, or a combination of the devices. In the present embodiment, the storage unit 12 is configured to store a database, and the database records, for instance, a plurality of profile information pre-established by a user and business card information corresponding to each of the profile information.

The display unit 13 is, for instance, a liquid crystal display (LCD), a light-emitting diode (LED) display, an organic light-emitting display (OLED), an electro-phoretic display (EPD), a micro-projection display adopting an LED light source or a laser light source, or other types of displays, and the display unit 13 is coupled to the processing unit 14, and can display an image outputted by the processing unit 14. The display unit 13 adopts, for instance, a transparent or semitransparent display panel such that the user wearing the smart glasses 10 not only can see the image displayed by the display unit 13, but can also see the image located in the field of view of the smart glasses 10 behind the display unit 13 through the display unit 13, thus achieving the function of augmented reality.

The processing unit 14 is coupled to the image capturing unit 11, the storage unit 12, and the display unit 13, and the processing unit 14 is, for instance, a central processing unit (CPU) having a single-core or a multi-core, or other programmable general purpose or special purpose microprocessors, digital signal processors (DSP), programmable controllers, application-specific integrated circuits (ASIC), other similar devices, or a combination of the devices. In the present embodiment, the processing unit 14 can execute a computer program to achieve the method for recognizing and prompting a face of an embodiment of the invention. In the following, the detailed steps of the smart glasses 10 executing recognition and prompting of a face are described via embodiments.

Figure 2:
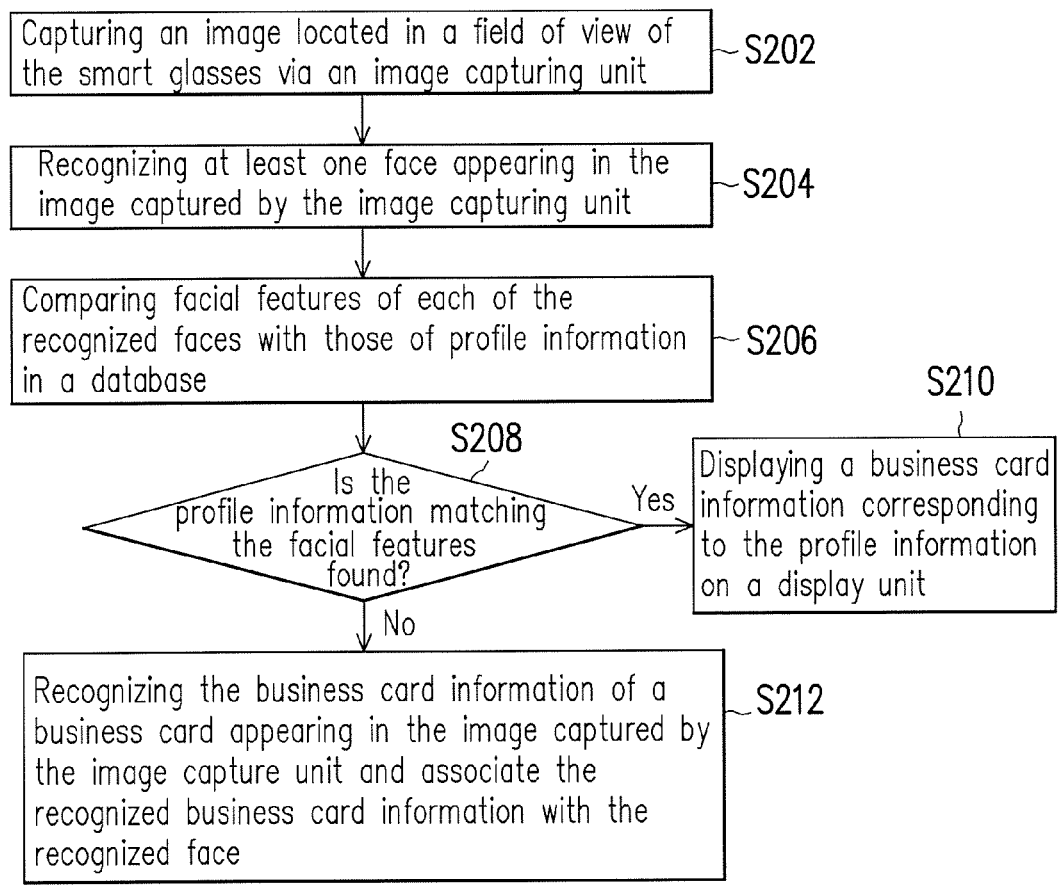
FIG. 2 is a flowchart of a method for recognizing and prompting a face illustrated according to an embodiment of the invention.

Specifically, FIG. 2 is a flowchart of a method for recognizing and prompting a face illustrated according to an embodiment of the invention. Referring to both FIG. 1 and FIG. 2, the method of the present embodiment is suitable for the smart glasses 10, and the detailed process of the method of the present embodiment is described with reference to each device of the smart glasses 10 in FIG. 1.

First, the processing unit 14 captures an image located in the field of view of the smart glasses 10 via the image capturing unit 11 (step S202). In particular, the processing unit 14 controls the image capturing unit 11 to capture an image when, for instance, the processing unit 14 receives a shooting operation triggered by the user (such as pressing or touching the shutter button or other buttons of the smart glasses 10).

Then, the processing unit 14 performs face recognition on the image captured by the image capturing unit 11 to recognize at least one face appearing in the captured image (step S204). In particular, the processing unit 14 recognizes the face appearing in the image via, for instance, the outline of the face, the positions and shapes of facial features, hairstyle, or skin color, and obtains the facial features of each of the faces.

Then, the processing unit 14 compares the facial features of each of the recognized faces with those of the profile information in a database (step S206) to find the profile information matching the facial features (step S208). In particular, the database stored in the storage unit 12 records information related to people that the user met in the past and for whom face recognition and business card recognition are completed, wherein the information includes features such as the outline of the face, positions and shapes of facial features, hairstyle, and skin color. The processing unit 14 can confirm whether the person currently meeting the user is a person the user met in the past by comparing the facial features of the recognized face with those of each of the profile information in the database.

If the profile information matching the facial features is found, the processing unit 14 provides the business card information corresponding to the profile information to display on the display unit 13 to prompt the user (step S210), and the display method includes, for instance, directly displaying the image of the business card or displaying the business card information obtained from the business card, and the invention is not limited thereto. Accordingly, the user can see relevant information of people met in the display unit 13 and therefore recognize the person.

On the other hand, if the profile information matching the facial features is not found, the processing unit 14 further recognizes the business card appearing in the image captured by the image capturing unit 11 to obtain the business card information, and then associates the recognized business card information with the recognized face and writes the association into the database (step S212). The business card information is, for instance, the name of a person or a company, a phone, a fax, an address, a URL, a unified code, an email address, or other personal information obtained via, for instance, the optical character recognition (OCR) of an image captured by the image capturing unit 11, and the invention is not limited thereto.

Figure 3A:
FIG. 3A to FIG. 3D are examples of a method for recognizing and prompting a face illustrated according to an embodiment of the invention.

For instance, FIG. 3A to FIG. 3D are examples of a method for recognizing and prompting a face illustrated according to an embodiment of the invention. Referring first to FIG. 3A, in the present embodiment, when the user meets a person 30, an image 32 of the person 30 can be taken via smart glasses 31. At this moment, the smart glasses 31 search the face in the image 32 and recognize a face 33 appearing in the image 32.

Figure 3B:
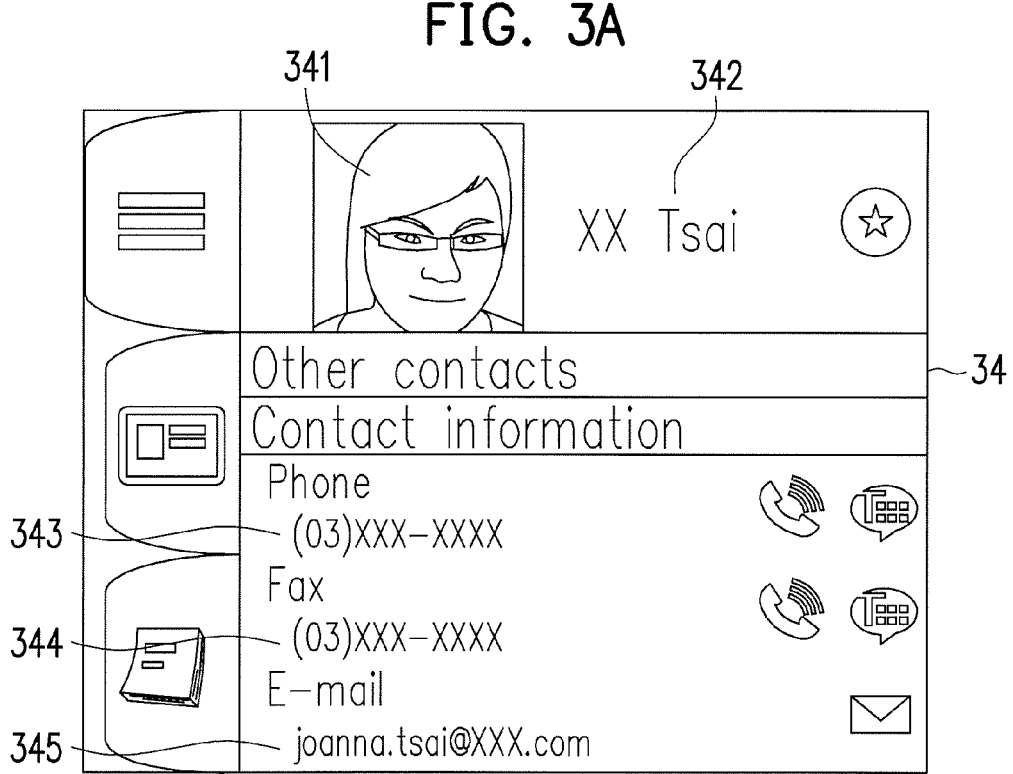

Then, the smart glasses 31 compare the facial features of the face 33 with those of the profile information stored in the database to find the profile information matching the facial features. In particular, if the smart glasses 31 find the profile information matching the facial features, a profile information interface 34 is displayed (as shown in FIG. 3B). The profile information interface 34 displays, for instance, personal information such as a head shot 341, a name 342, a company phone 343, a company fax 344, and a company email address 345.

Figure 3C:
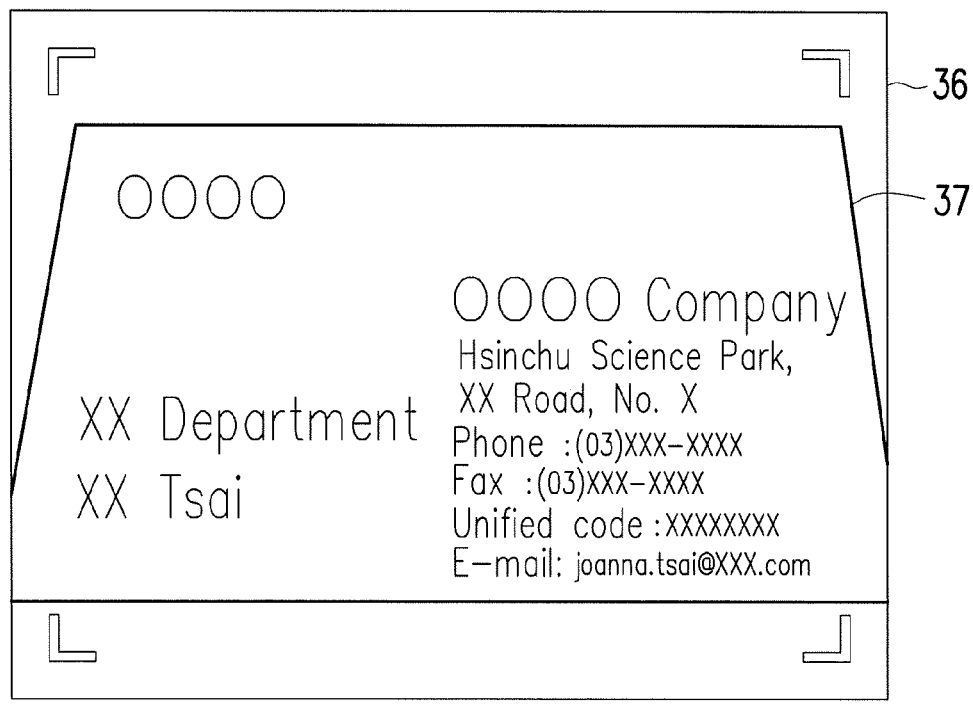
Figure 3D:
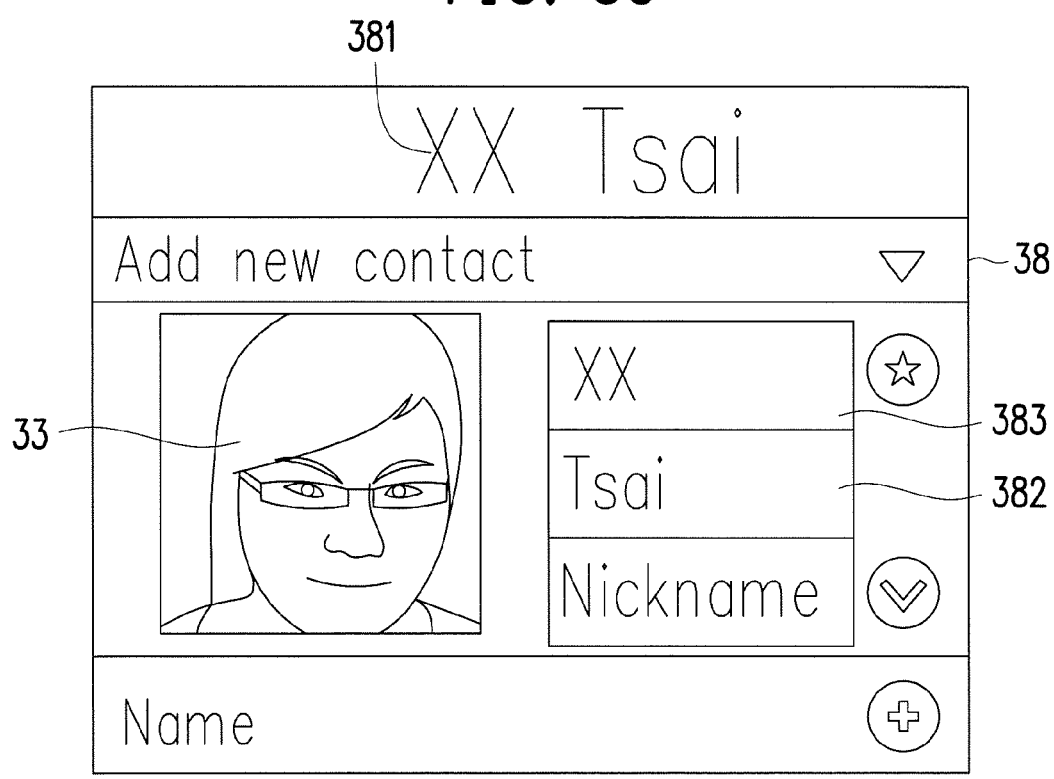

On the other hand, if the smart glasses 31 do not find profile information matching the facial features, the smart glasses 31 automatically take an image 36 of the business card received by the user (as shown in FIG. 3C), and recognize the business card information of a business card 37 appearing in the image 36. In particular, the smart glasses 31 display, for instance, a new contact adding interface 38 (as shown in FIG. 3D) after recognition is complete, and display the recognized name of a person 381 and the editing fields 382 and 383 of the last name and the name therein. After modification and confirmation by the user through the interface of the smart glasses, the smart glasses 31 associate the business card information with the face 33 recognized via the image 32 in FIG. 1, such that the identity of the person 30 can be recognized next time the user meets the person 30.

Via the above method, the user can instantly obtain the name or other relevant information of the person met via the auxiliary of the smart glasses, thereby achieving the objects of increasing social interaction and expanding network.

It should be mentioned that, when the user exchanges business cards, the actions of making eye contact, exchanging business cards, and looking at the business card occur in succession and are generally completed in a short period of time. Therefore, in an embodiment of the invention, the smart glasses can set a time interval between recognition of a face and recognition of a business card, so as to automatically recognize a business card when the smart glasses cannot find a profile information matching the facial features of the recognized face. In short, within the time interval, the smart glasses detect the business card in the image captured by the smart glasses. However, when the detection time exceeds the time interval, the smart glasses stop detecting the business card and recognizing the business card information. Detailed explanation is provided below via another embodiment.

Figure 4:
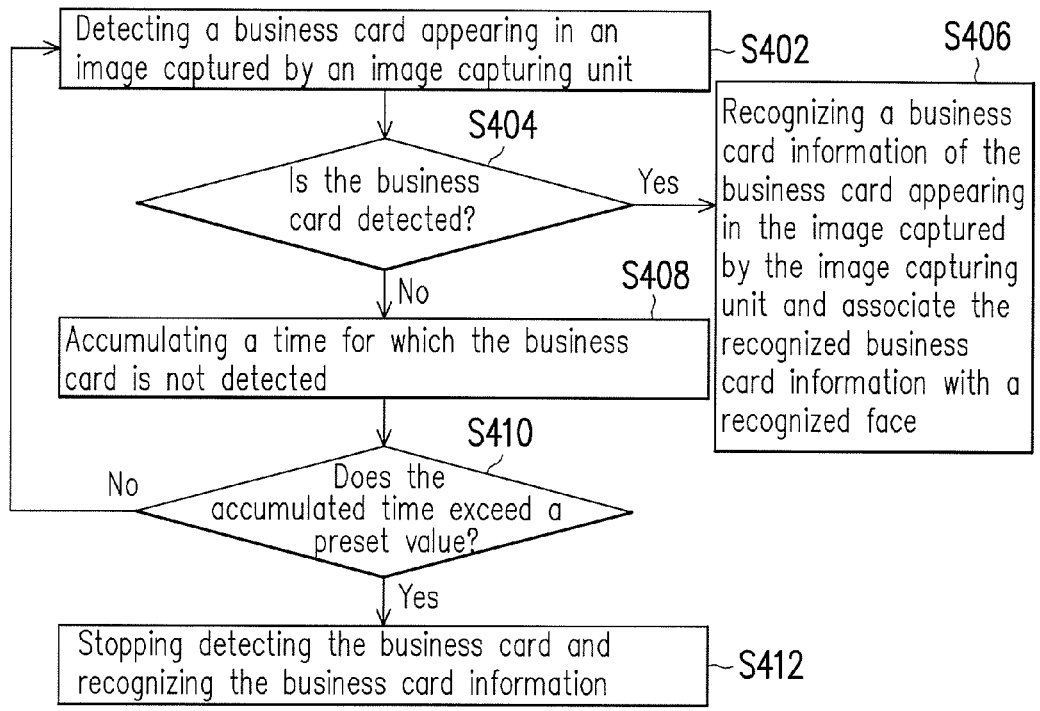
FIG. 4 is a flowchart of a method for associating a face with business card information illustrated according to an embodiment of the invention.

FIG. 4 is a flowchart of a method for associating a face with business card information illustrated according to an embodiment of the invention. Referring to both FIG. 1 and FIG. 4, the method of the present embodiment is adapted for the smart glasses 10, and the detailed process of the method of the present embodiment is described with reference to each device of the smart glasses 10 in FIG. 1.

In the present embodiment, referring to FIG. 4, after step S208 of FIG. 2, that is, if the profile information matching the facial features is not found, the processing unit 14 detects the business card appearing in the image captured by the image capturing unit 11 (step S402) to determine whether the business card is detected (step S404). The processing unit 14 detects whether a business card appears in the image by, for instance, analyzing the shape or the area of the white region in the image or a text therein, and the invention is not limited thereto.

In particular, if a business card is detected, the processing unit 14 recognizes the business card information of the business card appearing in the image captured by the image capturing unit 11 and associates the recognized business card information with the recognized face (step S406). The step is the same as or similar to step S212 in the above embodiments, and therefore the detailed implementation thereof is not repeated herein.

On the other hand, if a business card is not detected, the processing unit 14 accumulates a time for which the business card is not detected thereof (step S408), and determines whether the accumulated time exceeds a preset value (step S410). The preset value is, for instance, 5 seconds, 10 seconds, 20 seconds, 30 seconds, or other times of suitable length, and the invention is not limited thereto.

In particular, if the accumulated time does not exceed the preset value, the processing unit 14 detects the business card appearing in the image captured by the image capturing unit 11 (step S402). On the other hand, if the accumulated time exceeds the preset value, the processing unit 14 stops detecting the business card and recognizing the business card information (step S412).

Via the association mechanism, the invention can accurately associate the business card information of the business card received by the user with the owner of the business card, and prevent associating wrong information with the recognized face, and operational costs needed for the smart glasses 10 to continuously execute detection of business cards and recognition of business card information are reduced.

Moreover, since the distance between the user and the other person needs to be within the reach of each other's hands when business cards are exchanged, the head of the other person occupies a fixed ratio or size in the image taken by the smart glasses. Accordingly, in the invention, a preset range the size of a face is set according to the above distance, thus facilitating the smart glasses in determining whether the person in the image taken by the smart glasses is a person with whom the user exchanged business cards with. Detailed explanation is provided below via another embodiment.

Figure 5:
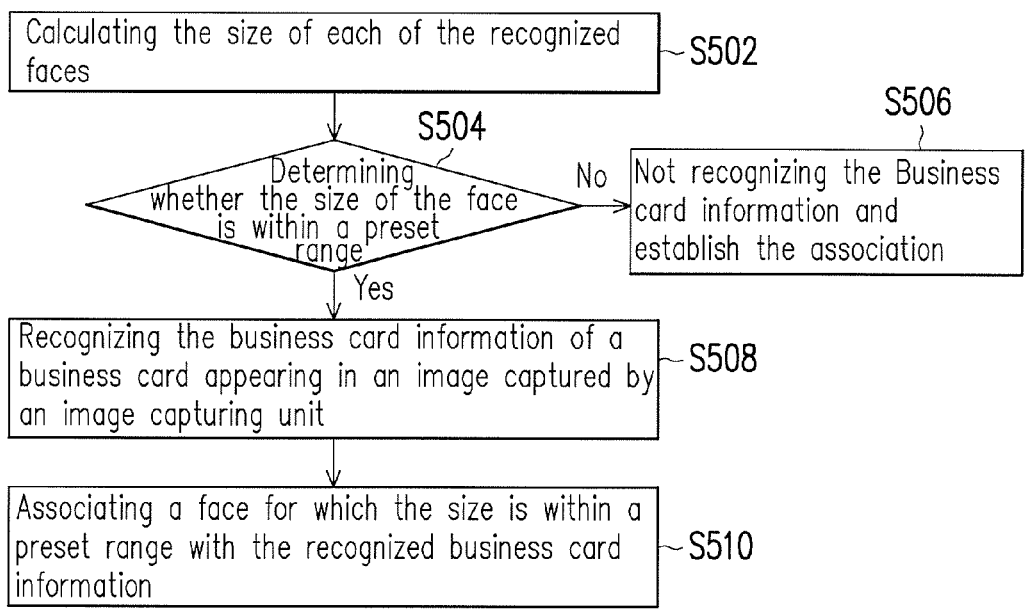
FIG. 5 is a flowchart of a method for associating a face with business card information illustrated according to an embodiment of the invention.

FIG. 5 is a flowchart of a method for associating a face with business card information illustrated according to an embodiment of the invention. Referring to both FIG. 1 and FIG. 5, the method of the present embodiment is suitable for the smart glasses 10, and the detailed process of the method of the present embodiment is described with reference to each device of the smart glasses 10 in FIG. 1.

In the present embodiment, after step S208 of FIG. 2, that is, if the profile information matching the facial features is not found, the processing unit 14 first calculates the size of each of the recognized faces before recognizing the business card information (step S502), and determines whether the size of the face is within a preset range (step S504). The preset range is, for instance, the ratio of the image occupied by the face, such as 20%, 30%, or 50%, or a specific numeric value, and the invention does not limit the preset range.

In particular, if the processing unit 14 determines the size of the face is within, the preset range, the processing unit 14 starts the step of recognizing the business card information to recognize the business card information of the business card appearing in the image captured by the image capturing unit 11 (step S508), and associates the face for which the size is within the preset range with the recognized business card information (step S510). In the opposite case, the business card information is not recognized and the association is not established (step S506). The step of recognizing the business card information and establishing the association is the same as or similar to step S212 of the above embodiments, and therefore details thereof are not repeated herein.

The face selection mechanism can prevent the association of business card information with wrong person, and can also ensure that the face for which an association is established is the person with whom the user exchanged business cards with.

It should be mentioned that, in the above embodiments, after the face is recognized, whether to perform the recognition of the business card information is decided according to the size of the face. In another embodiment, whether the size of the face of a person matches the preset range is continued only after the business card information is recognized, and which face the business card information is to be associated with is accordingly decided.

Moreover, in other embodiments, the method for recognizing and prompting a face of the invention can further facilitate the smart glasses in finding the profile information corresponding to the face in the database via positioning and voiceprint recognition. Detailed explanation is provided below via another embodiment.

Figure 6:
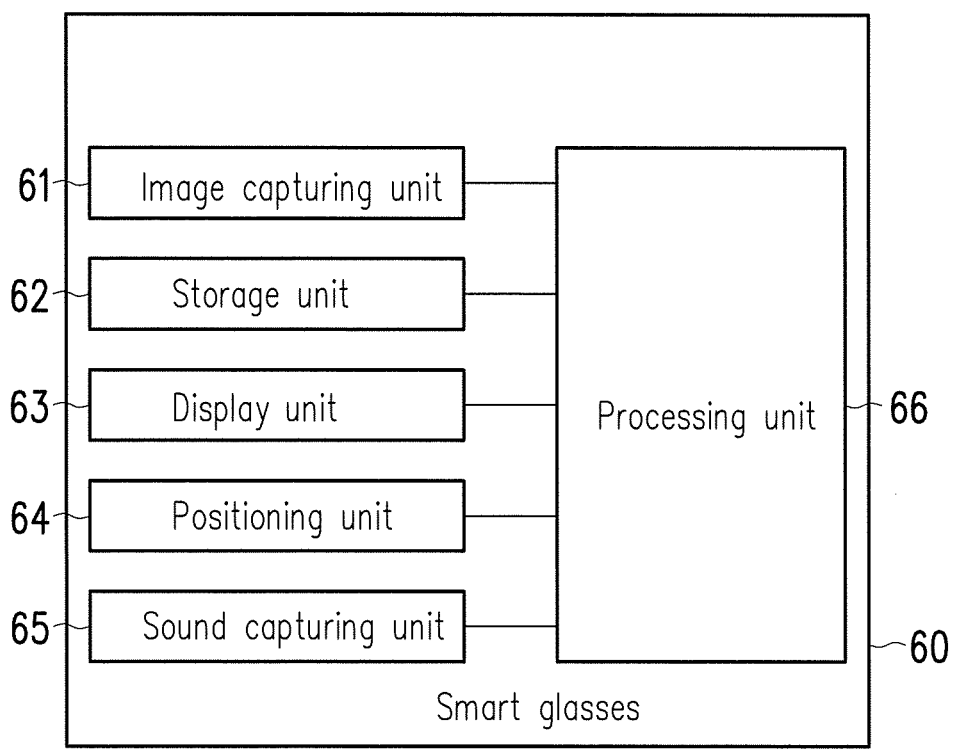
FIG. 6 is a block diagram of smart glasses illustrated according to an embodiment of the invention.

FIG. 6 is a block diagram of smart glasses illustrated according to an embodiment of the invention. Referring to FIG. 1, smart glasses 60 of the present embodiment include an image capturing unit 61, a storage unit 62, a display unit 63, a positioning unit 64, a sound capturing unit 65, and a processing unit 66, wherein the functions of the image capturing unit 61, the storage unit 62, the display unit 63, and the processing unit 66 are the same as or similar to those of the image capturing unit 11, the storage unit 12, the display unit 13, and the processing unit 14 in the above embodiments and are therefore not repeated herein.

The present embodiment is different from the above embodiments in that the smart glasses 60 of the present embodiment further include the positioning unit 64, and the positioning unit 64 is, for instance, a global positioning system (GPS) or other communication positioning systems positioning via a global system for mobile communication (GSM) system, a personal handy-phone system (PHS), a code division multiple access (CDMA) system, a wireless fidelity (Wi-Fi) system, a worldwide interoperability for microwave access (WiMAX) system, a radio repeater, or a radio broadcaster, and the invention is not limited thereto.

The processing unit 66 further positions the smart glasses 60 via the positioning unit 64 when, for instance, comparing the facial features of the recognized face with those of the profile information in the database to obtain the location of the smart glasses 60, and then compares the location with the address in the business card information of each of the profile information in the database to select the profile information for which the address is close to or the same as the location, and compares the facial features of the profile information with those of each of the recognized faces.

Moreover, the smart glasses 60 of the present embodiment also include a sound capturing unit 65, and the sound capturing unit 65 is, for instance, a dynamic microphone, a condenser microphone, an electret condenser microphone, an MEMS microphone, or a directional microphone having different sensitivity toward sounds from different angles, and the invention is not limited thereto.

The processing unit 66 may capture a surrounding voiceprint signal via the sound capturing unit 65 in the meantime of the processing unit 66 capturing the image via the image capturing unit 61. And when comparing the information, the processing unit 66 compares the captured voiceprint signal with the voiceprint signal of each of the profile information in the database to find the profile information matching the voiceprint signal. If the processing unit 66 finds the profile information matching both the voiceprint signal and the facial features in the database, the business card information corresponding to the profile information is displayed on the display unit 63.

Via the auxiliary of the positioning unit 64 and the sound capturing unit 65, the smart glasses 60 can more accurately confirm the identity of a person met by the user, and thereby prompt the user.

Based on the above, the smart glasses and the method for recognizing and prompting a face using the smart glasses take an image of a person met by the user and recognize a face, and can facilitate the user to instantly recognize the identity of the person met, thereby achieving the objects of increasing social interaction and expanding network. In case that the person cannot be recognized, the invention also provides a complete business card information establishing mechanism capable of accurately associating the recognized business card information with the face of the person in the captured image with whom the user actually exchanged business cards with, thus eliminating tedious setting steps.

The above are only preferred embodiments of the invention, and are not intended to limit the scope of implementation of the invention. That is, any simple change and modification made according to the claims and specification of the invention resulting in the same effect are within the patent scope of the invention. Moreover, any of the embodiments or any of the claims of the invention does not need to achieve all of the objects, advantages, or features disclosed by the invention. Moreover, the abstract and the headings are merely used to aid in searches of patent files and are not intended to limit the scope of the claims of the invention. Moreover, "first", "second", etc. mentioned in the specification and the claims are merely used to name the elements and should not be regarded as limiting the upper or lower bound of the number of the components/devices.

What is claimed is:

1. A method for recognizing and prompting a face, adapted for smart glasses having an image capturing unit, a storage unit, and a display unit, wherein the storage unit stores a database recording a plurality of profile information and business card information corresponding to each of the profile information, the method comprising:
    capturing an image located in a field of view of the smart glasses via the image capturing unit;
    recognizing at least one face appearing in the image captured by the image capturing unit;
    comparing facial features of each of the recognized faces with the facial features of the profile information in the database to find the profile information matching the facial features;
    displaying the business card information corresponding to the profile information on the display unit if the profile information matching the facial features is found; and
    recognizing the business card information of a business card appearing in the image captured by the image capturing unit and associating the recognized business card information with the recognized face if the profile information matching the facial features is not found.

2. The method of claim 1, wherein before the step of recognizing the business card information of the business card appearing in the image captured by the image capturing unit, the method further comprises:
    detecting whether the business card appears in the image captured by the image capturing unit; and
    accumulating a time for which the business card is not detected, and stopping the detection of the business card and the recognition of the business card information when the accumulated time exceeds a preset value.

3. The method of claim 1, wherein the step of comparing the facial features of each of the recognized faces with the facial features of the profile information in the database to find the profile information matching the facial features further comprises:
    calculating a size of each of the recognized faces and determining whether the size of the face is within a preset range if the profile information matching the facial features is not found; and
    starting the step of recognizing the business card information and associating the face for which the size is within the preset range with the recognized business card information if the size of the face is within the preset range.

4. The method of claim 1, wherein the step of associating the recognized business card information with the recognized face further comprises:
  calculating a size of each of the recognized faces and determining whether the size of the face is within a preset range; and
  associating the face for which the size is within the preset range with the recognized business card information.

5. The method of claim 1, wherein the smart glasses further comprises a positioning unit, and the step of comparing the facial features of each of the recognized faces with the facial features of the profile information in the database to find the profile information matching the facial features further comprises:
  positioning the smart glasses via the positioning unit to obtain a location of the smart glasses; and
  comparing the location with an address in the business card information of each of the profile information in the database to select the profile information for which the address is close to the location, and comparing the facial features of the profile information with the facial features of each of the recognized faces.

6. The method of claim 1, wherein the smart glasses further comprise a sound capturing unit, and the method further comprises:
  capturing a voiceprint signal via the sound capturing unit in the meantime of capturing the image via the image capturing unit;
  comparing the captured voiceprint signal with the voiceprint signal of each of the profile information in the database to find the profile information matching the voiceprint signal; and
  displaying the business card information corresponding to the profile information on the display unit if the profile information matching both the voiceprint signal and the facial features is found.

7. Smart glasses, comprising:
  an image capturing unit capturing an image located in a field of view of the smart glasses;
  a storage unit storing a database, wherein the database records a plurality of profile information and a business card information corresponding to each of the profile information;
  a display unit; and
  a processing unit coupled to the image capturing unit, the storage unit, and the display unit, recognizing at least one face appearing in an image captured by the image capturing unit, and comparing facial features of each of the recognized faces with the profile information in the database to find the profile information matching the facial features, wherein
    the business card information corresponding to the profile information is displayed on the display unit if the profile information matching the facial features is found; and
    the business card information of a business card appearing in the image captured by the image capturing unit is recognized and the recognized business card information is associated with the recognized face if the profile information matching the facial features is not found.

8. The smart glasses of claim 7, wherein the processing unit further detects whether the business card appears in the image captured by the image capturing unit, accumulates a time for which the business card is not detected, and stops the detection of the business card and the recognition of the business card information when the accumulated time exceeds a preset value.

9. The smart glasses of claim 7, wherein the processing unit further calculates a size of each of the recognized faces and determines whether the size of the face is within a preset range if the profile information matching the facial features is not found, wherein
  the processing unit starts the step of recognizing the business card information and associates the face for which the size is within the preset range with the recognized business card information if the size of the face is within the preset range.

10. The smart glasses of claim 7, wherein the processing unit further calculates a size of each of the recognized faces and determines whether the size of the face is within a preset range, and only associates the face for which the size is within the preset range with the recognized business card information.

11. The smart glasses of claim 7, further comprising:
  a positioning unit positioning the smart glasses to obtain a location of the smart glasses, wherein
  the processing unit further compares the location with an address in the business card information of each of the profile information in the database to select the profile information for which the address is close to the location, and compares the facial features of the profile information with those of each of the recognized faces.

12. The smart glasses of claim 7, further comprising:
  a sound capturing unit capturing a voiceprint signal at the same time the image capturing unit captures the image, wherein
  the processing unit comprises comparing the captured voiceprint signal with the voiceprint signal of each of the profile information in the database to find the profile information matching the voiceprint signal, and displays the business card information corresponding to the profile information on the display unit when the profile information matching both the voiceprint signal and the facial features is found.

* * * * *